July 13, 1948.  C. E. GEARHART  2,445,060

MICROMETER DEPTH GAUGE

Filed June 7, 1946

Inventor

Carl Edward Gearhart

By Clarence A. O'Brien
and Harvey B. Jacobson
Attorneys

Patented July 13, 1948

2,445,060

UNITED STATES PATENT OFFICE 2,445,060

MICROMETER DEPTH GAUGE

Carl Edward Gearhart, Wilmington, Del.

Application June 7, 1946, Serial No. 675,002

1 Claim. (Cl. 33—170)

This invention relates to new and useful improvements and structural refinements in micrometer depth gauges, and the principal object of the invention is to provide a device of the character herein described, which is particularly adapted for measuring the depth of screw threads.

A further object of the invention is to provide a micrometer depth gauge which may be readily applied to the work and in which the reading may be easily and directly obtained.

Another object of the invention is to provide a micrometer depth gauge which may be quickly and conveniently adjusted to compensate for wear.

An additional object of the invention is to provide a micrometer depth gauge which is simple in construction and operation, and which cannot easily become damaged.

A still further object of the invention is to provide a micrometer gauge which may be readily disassembled for purposes of cleaning, inspection or repair.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
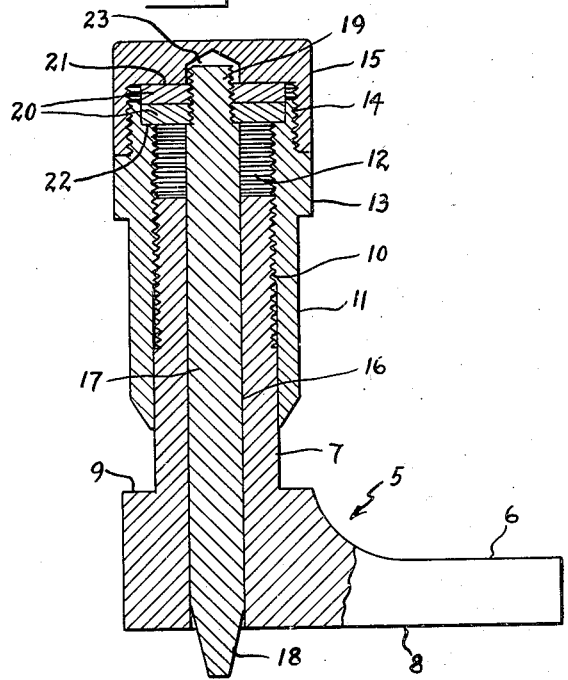
Figure 1 is a cross sectional view of the invention.
Figure 2:
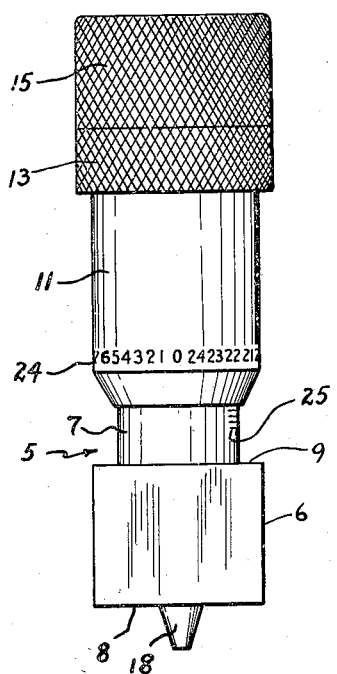
Figure 2 is a side elevation thereof.
Figure 3:
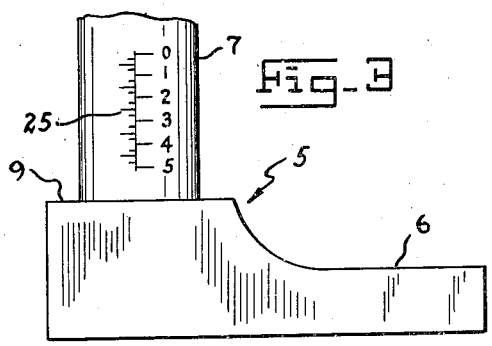
Figure 3 is a fragmentary side elevation of the gauge frame.

Referring now to the accompanying drawings in detail, the invention embodies in its construction a frame designated generally by the reference character 5, the same consisting of a block 6 and a barrel 7. The block 6 is configurated substantially as shown and is formed on one side thereof with a substantially flat gauging surface 8, its relatively opposite surface being upraised as at 9, to carry the aforementioned barrel.

The barrel 7 is provided with an externally threaded portion 10, this being adapted to receive an internally threaded thimble 11. The internal threading of the thimble is illustrated at 12, and the body of the thimble is provided medially of its length with a knurled shoulder 13. The thimble 11 is also formed with an externally threaded portion 14, and an externally knurled, internally threaded cap 15 is positioned on the threaded portion 14, as will be clearly apparent from the accompanying drawing.

The bore 16 of the barrel 7 is extended through the block 6 and a spindle 17 is slidably and rotatably positioned in said bore, with one end of the spindle projecting from the gauging surface 8. The projecting end portion of the spindle 17 assumes a substantially frusto-conical configuration as at 18, the purpose thereof being hereinafter more fully explained.

The remaining end of the spindle 17 is formed integrally with a screw threaded shank 19, and a pair of lock nuts are positioned on this shank, as is best shown in Figure 1. It will be noted that the nuts 20 are clamped between the inner end surface 21 of the cap 15 and the adjacent end surface 22 of the thimble 11. If desired, the end 22 of the thimble may be counterbored to receive the nuts 20, substantially as shown in the drawing. Furthermore, the end surface 21 of the cap 15 is formed with a blind bore or recess 23, this being adapted to freely receive the end portion of the shank 19.

Suitable graduations 24 are provided on the thimble 11, and coacting graduations 25 are inscribed on the lateral surface of the barrel 7.

When the invention is placed in use, such as for example, in measuring the depth of thread on a bolt, the gauge is applied so that the gauging surface 8 lies upon the outside diameter of the screw thread to be measured.

Figure 4:
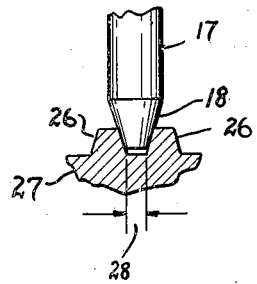
Figure 4 is a fragmentary detail, illustrating the manner in which the invention is used.

Thereupon, the thimble 11 and the associated cap 15 are rotated, this rotation being simultaneous with the rotation of the spindle 17, whereby the projecting end portion 18 of the spindle engages the threads 26 of the screw 27, as is shown in Figure 4. It will be apparent that in this manner, the length of the spindle 17 which projects from the gauging surface 8 will correspond to the depth of the threads 26, and the appropriate measurement made be directly read on the graduated scales 24, 25. Inasmuch as it is preferable that the spindle portion 18 contacts the sides of the thread rather than the root thereof, the minor diameter of the frusto-conical portion 18 may be somewhat larger than the distance 28 at the root of the threads. In this manner, a certain amount of space will exist between the end of the portion 18 and the root of the threads, and the graduations 24, 25 should, of course, be calibrated so as to compensate for this spacing.

The gauge may be easily adjusted to compensate for wear of the portion 18, this being accomplished by simply removing the cap 15 from the thimble 11 and adjusting the setting of the nuts 20 on the shank 19.

It should be understood that gauges constructed in accordance with this invention may possess spindles of different diameters and the portion 18 of such spindles may be configurated in accordance with the size, form and finesse of the thread for which they are intended.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

A micrometer depth gauge comprising in combination, a block having a substantally flat gauging surface on one side thereof, a barrel formed at the relatively opposite side of said block, the bore of said barrel extending through said block, an externally threaded portion on said barrel, an internally threaded thimble positioned on said externally threaded portion, an externally threaded portion on said thimble, an internally threaded cap positioned on the externally threaded portion of said thimble, a spindle slidably and rotatably positioned in said bore with one end thereof projecting from said gauging surface, a screw threaded shank at the remaining end of said spindle, a pair of lock nuts on said shank, said nuts being clamped between said thimble and said cap, and coacting graduations on said thimble and on said barrel, said graduations being readable in accordance with the length of the projecting portion of said spindle.

CARL EDWARD GEARHART.

REFERENCES CITED

The following references are of record in the file of this patent:

UNITED STATES PATENTS

| Number | Name | Date |
|---|---|---|
| 438,851 | Malmquist | Oct. 21, 1890 |
| 623,748 | Walters | April 25, 1899 |
| 1,656,302 | Swaney | Jan. 17, 1928 |
| 1,817,622 | Hansen | Aug. 4, 1931 |